Figure 1:
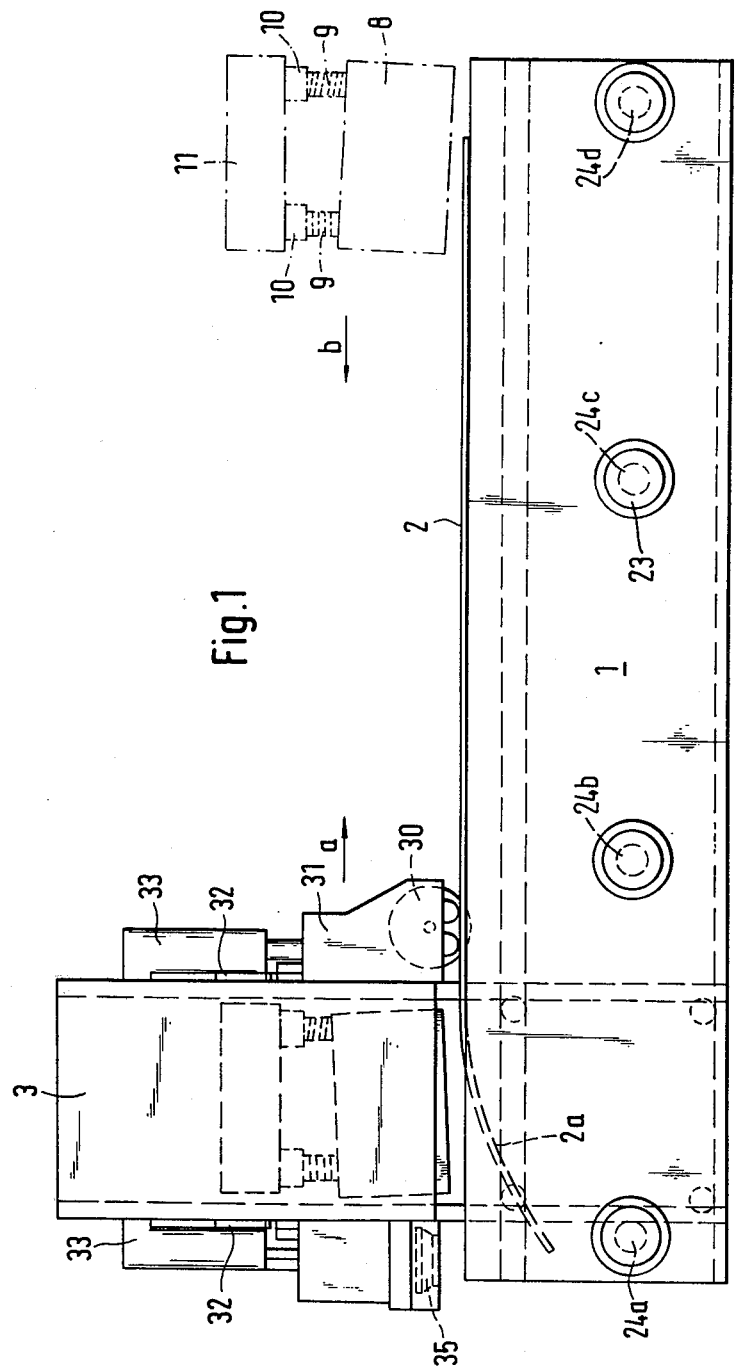

United States Patent [19]

Frick et al.

[11] 4,433,467
[45] Feb. 28, 1984

[54] GATE SHEARS, SAW AND MILLING TOOL ON COMMON CARRIAGE

[75] Inventors: Georg Frick, Riemgrabenallee; Harro Reiff, Schloss; Alois Kirsch, Riemgrabenallee, all of Fed. Rep. of Germany

[73] Assignee: karl Mengele & Söhne, Gunzburg, Fed. Rep. of Germany

[21] Appl. No.: 316,968

[22] Filed: Oct. 30, 1981

[51] Int. Cl.³ .............................................. B23Q 41/00
[52] U.S. Cl. ........................................ 29/565; 29/53; 83/513
[58] Field of Search ................. 83/513, 558, 636, 640; 29/50, 52, 55, 56, 34 R, 53, 565

[56] References Cited

U.S. PATENT DOCUMENTS

| | | | |
|---|---|---|---|
| 1,573,483 | 2/1926 | Enderes | 83/558 |
| 3,154,988 | 11/1964 | Greis | 83/558 X |
| 3,253,492 | 5/1966 | Petros et al. | 83/558 X |
| 3,762,273 | 10/1973 | Sprung | 83/513 X |

*Primary Examiner*—Frank T. Yost
*Attorney, Agent, or Firm*—Toren, McGeady and Stanger

[57] ABSTRACT

A cutting machine for cutting sheet metal plates and the like includes a support table for the material to be cut. A shears frame mounts a movable shears blade and the frame is movable back and forth along one edge of the support table. In addition to the movable blade, the shears frame mounts a circular saw in spaced relation to the movable blade. The circular saw is movable on the shears frame in the up and down direction relative to the support table. Further, the cutting line of the circular saw is parallel to the cutting line of the movable blade.

6 Claims, 3 Drawing Figures

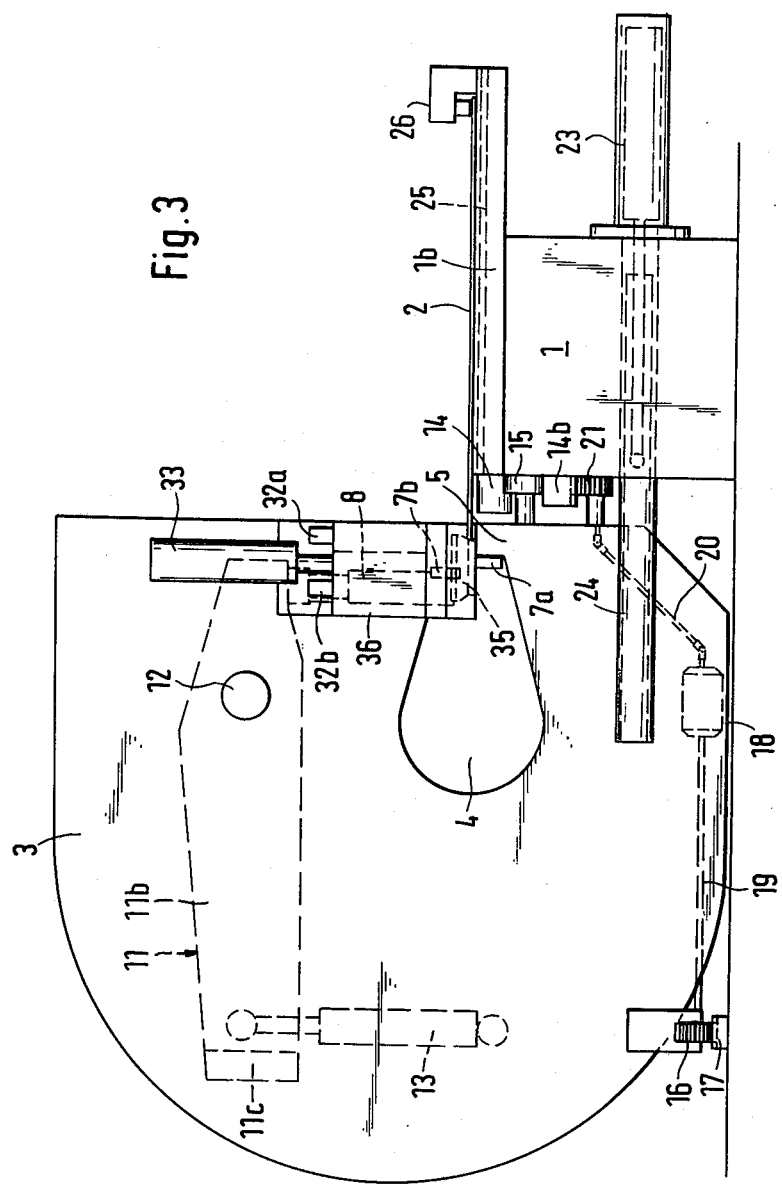

GATE SHEARS, SAW AND MILLING TOOL ON COMMON CARRIAGE

The invention relates to a gate shears having an upper blade which is moved against a fixed lower blade, and having a shearing table.

Compared with blades rotating about an axis, such as circular saws, sheet metal is cut with gate shears in a fraction of the time required, and with a far longer service life of the blades. Whereas the stresses on the edge zones caused in the case of wide sheet-metal cuts have hardly any effect, in the case of narrow sheet-metal strips these stresses make a great difference. In particular, sheet-metal strips up to 10–12 times the sheet thickness usually bend in the shape of a bow to such a degree that they can be restraightened only with difficulty. Hence both machines are in principle required for producing sheet metal-sections of any desired size, and hence to cut a metal sheet into wide and narrow sheet sections the metal sheets must be worked on both machines in succession, which, apart from the machine consumption, necessitates larger working surfaces and transporting means.

A disadvantage of gate shears is that they can be made only up to a length of 6, or at most 8, meters. Even at such lengths the table and blade face are already subjected to severe deflection stresses which with distance increase to the third power. This deflection is further increased by the holding-down device which is necessary on the table. A compensation for this deflection would be very costly. Hence inaccuracies caused thereby have had until now to be taken into account.

In the case of long gate shears, the material consumption also has a quite adverse effect. For example, the weight of a gate shears of 12 meters would at least double compared to one of 8 meters.

Hence gate shears have until now rarely been constructed longer than 6 to 8 meters at most.

For many purposes, and also as regards continuous working procedures, far greater table lengths would however be advantageous.

The object of the invention is to avoid the above disadvantages and to utilize the advantages of both cutting devices in one combination.

The object of the invention is achieved in that a supporting table several times longer in relation to the upper blade length of the shears frame is assigned to the shearing table of the gate shears according to West German Offengungsschrift 29 50 555 outside the shearing frame and in that the stand of the gate shears is longitudinally displaceable with sliding parts in guide rails arranged along its length and on the other hand is supported at the base by a drivable undercarriage in a guide rail or in a guide gear rack, the fixed lower blade being secured either lengthwise on the shearing table or else lengthwise along the whole length of the supporting table, and holding-down devices being provided which have a corresponding action on the shearing table or against the supporting table, and in that on one of the two sides of the shears frame at least one cutting tool rotating about an axis (such as a circular saw with a carriage and with an adjusting device) is arranged so as to be able to be raised and lowered in sliding guides on the stand of the gate shears, and in that the cutting line of the circular saw is parallel to the direction of the cutting edge of the gate shears in front of the shearing table.

It is clear that by means of the stepwise working procedure of the gate shears which is herewith possible — a procedure which consists in the cutting of a partial cutting line, in the further movement of the shears along the supporting table by a length equal to the length of the upper blade, and then again of the next cut — only slight forces are required to move the cutting elements (a fact which also affects the weight of the gate shears), and that because of the short cutting lengths in the case of wider cuts only practically negligible deformations can still occur, with the result that the gate shears according to the invention can now be constructed without any limitation as to length.

Deformations can also no longer occur on the severed sheet-metal strips themselves, since the cut is always made with the same small cutting angle.

A further advantage of the invention is that tables already on hand can be lengthened as required, or the table length can even be shortened again if necessary. The gate shears according to the invention can thereby also be adapted to slightly varying requirements.

To cut off narrow sheet-metal strips, according to the invention the circular blade is used. Since in this connection the strips are bent only to one side, they are relatively easier to straighten out and the blades of the gate shears are conserved, in consideration of their rather short working life when cutting relatively narrow sheet-metal strips, whereas on the other hand the gate shears is used for cutting relatively wider sheet sections and in doing so works many times faster than the circular blade.

Figure 2:
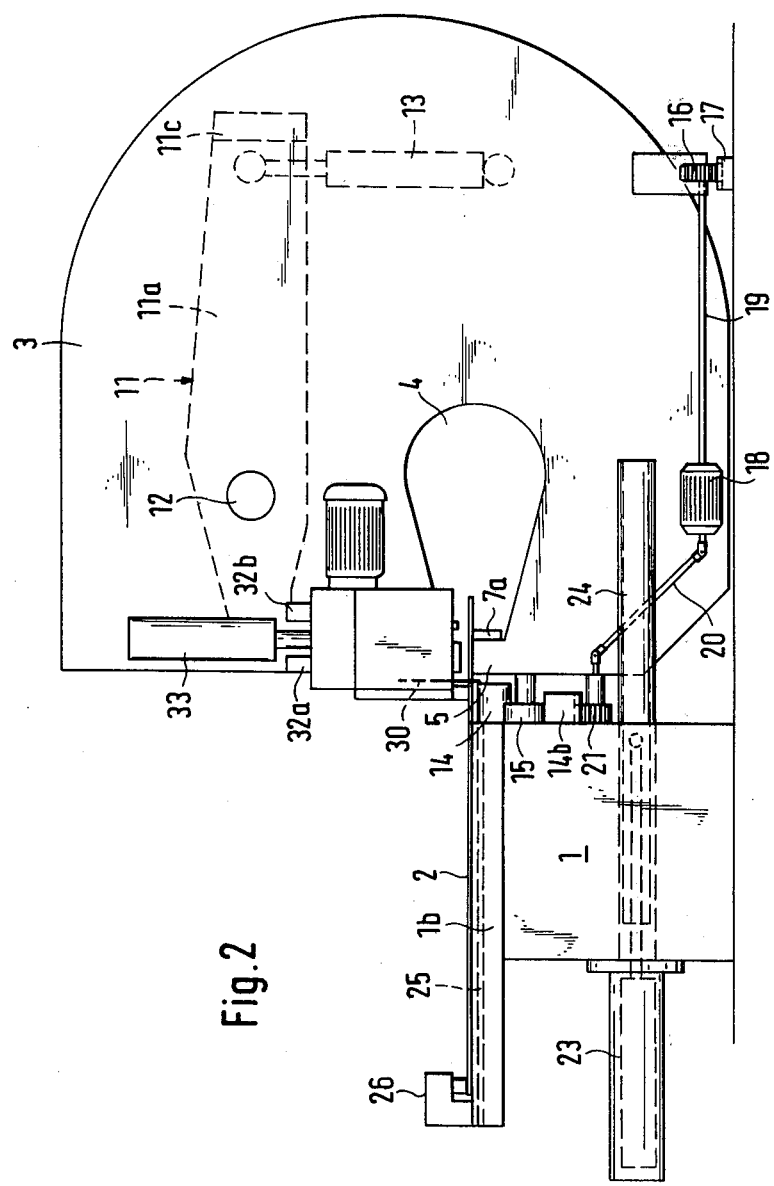

The invention is explained and described in more detail in the drawing with the aid of an embodiment. Shown are:

FIG. 1, a combined shears according to the invention, seen from the rear side of the supporting table;

FIG. 2, a side view of the gate shears shown in FIG. 1; and

FIG. 3, a side view of the gate shears according to FIG. 1, seen from the other side.

In the drawing, in FIGS. 1 and 2 a supporting table is marked 1 and a metal sheet lying thereon is marked 2. 3 is a C-shaped frame, of which the opening 4 is opposite the supporting table 2. A narrow shearing table 5 (see FIG. 2) is arranged at the same height as the supporting table and underneath the opening 4; a holding-down device is arranged thereabove. A fixed lower blade 7a is provided at the rear of the shearing table 5. An upper blade 7b working together with the lower blade 7a is arranged on a ram 8 which is arranged in a height-adjustable manner on an oscillating drive crank 11 via two spindles 9 and spindle nuts 10.

The side arms 11a and 11b of the oscillating drive crank are rotatably mounted in joints 12 on the shears frame 3 and are driven by means of a cylinder piston unit 13 which drives on the rear crossbar of the oscillating drive crank 11c.

In accordance with the invention, the length of the shears is only a fraction of the length of the supporting table, as is illustrated in FIG. 1. Guide rails 14, in which sliding rollers 15 connected to the shears frame 3 are mounted in a longitudinally displaceable manner, extend along the whole length of the supporting table at the front side thereof. At the base, the shears frame 3 together with a drive pinion 16 is supported in a rail 17 with a guide gear rack. One of the drive pinions 16 is driven by means of a drive motor 18 via a universal joint shaft 19. The drive motor 18 drives, via an additional universal joint shaft 20, a drive pinion 21 which meshes on a guide gear rack of the guide rail 14b. Brackets 24 which can disengage in the manner of a telescope from housings 23 are arranged beneath the guide rail 14b, in distribution on the longitudinal side of the supporting table 1. On the upper side of the table, transverse grooves 25 are provided in which clamping cylinders 26 are held in a sliding manner, with which clamping cylinders 26 the metal sheet 2 is held fast at the sheet edge situated opposite the strip to be cut off.

The mode of operation of the gate shears according to the invention is illustrated in FIG. 1, in which on the left-hand side it is drawn in the position after the first cut of the sheet 2. The gate shears is now moved to the right with the aid of the driven pinions 16 and 21 for the second cut in the cutting line (arrow a) and then another piece of the metal strip 2a is cut off.

As soon as the gate shears has passed the brackets 24b and 24c, the latter are moved out automatically, so that they and the bracket 24a support the severed metal strip 2a. As soon as the gate shears has reached the right-hand side (as indicated with a broken line) the ram 8 together with the lower blade 4 is brought via the drive (not illustrated) of the spindle nuts 9 into the opposite oblique position, and after insertion of the metal sheet 2 into the frame opening 4 another strip is cut off, in the opposite direction (arrow b).

In accordance with the invention, a circular saw 30 with housing 31 (in which also the drive of the circular saw 30 is placed) is arranged on the right-hand side on the frame 3 of the gate shears. The housing 31 is vertically adjustable on sliding rails 32a and 32b (FIG. 2). 33 is an hydraulic piston cylinder unit for the feed.

On the other side (according to FIGS. 1 and 3), in exactly the same manner, a horizontally revolving milling head is arranged so as to be able to be raised and lowered vertically.

We claim:

1. Cutting machine for cutting sheet metal plates and the like comprising an elongated support table (1) having a pair of opposite spaced elongated sides, a shears frame (3) extending outwardly from and along one of the elongated sides of said support table, gate shears including a fixed blade (7a) and a movable blade (7b) each extending in the elongated direction of said support table with said support table having a length in the elongated direction thereof which is a multiple of the length of said movable blade, said movable blade is mounted on said shears frame, means for moving said shears frame back and forth along said support table, a shearing tabe (5) extending along said elongated side of said support table along which said shears frame is movable, said fixed blade is attached to one of said shearing table and said support table, and a cutting tool is mounted on said shears frame in spaced relation to said movable blade thereon, said cutting tool has a cutting edge rotatable about an axis, means on said shears frame for lifting and lowering said cutting tool relative to said support table and shearing table, and said cutting edge of said cutting tool is arranged to cut along a line parallel to the cutting edge of said movable blade.

2. Cutting machine, as set forth in claim 1, including means on said support table for holding down the plates to be cut.

3. Cutting machine, as set forth in claim 1, wherein a milling head is mounted on said shears frame in spaced relation to said movable blade and said cutting tool, and means on said shears frame for moving said milling head in the up and down direction relative to said support table.

4. Cutting machine, as set forth in claim 1, wherein said shears frame is a C-shaped frame with the opening therein arranged facing said support table, said movable blade mounted on said frame at the opening therefrom above said support table.

5. Cutting machine, as set forth in claim 4, wherein said fixed blade is secured to said shearing table and said shearing table is formed as a part of said shears frame.

6. Cutting machine, as set forth in claim 1, wherein said means for moving said shears frame comprises a rail extending substantially parallel with said elongated direction of said support table and spaced laterally outwardly from the elongated edge of said support table along which said shears frame is movable, a drive pinion engageable with said rail, guide rails mounted on said support table and extending along the edge thereof along which said shears frame is movable, said guide rails including a guide gear rack, a drive pinion on said shears frame engageable with said guide gear rack, a drive motor, a universal joint shaft connected to said drive motor engageable with said drive pinion supported on said rail and with said drive pinion engageable with said guide gear rack for driving said shears frame along said support table.

* * * * *

UNITED STATES PATENT AND TRADEMARK OFFICE
CERTIFICATE OF CORRECTION

PATENT NO. : 4,433,467

DATED : February 28, 1984

INVENTOR(S) : Georg Frick, Harro Reiff, Alois Kirsch

It is certified that error appears in the above-identified patent and that said Letters Patent is hereby corrected as shown below:

In the heading of the Patent [73] should read as follows:

-- [73] Assignee: Karl Mengele & Söhne, Günzburg, Fed. Republic of Germany --.

Signed and Sealed this

Seventeenth Day of July 1984

[SEAL]

Attest:

GERALD J. MOSSINGHOFF

Attesting Officer

Commissioner of Patents and Trademarks